US012651863B2

(12) United States Patent
Hemond et al.

(10) Patent No.: US 12,651,863 B2
(45) Date of Patent: Jun. 9, 2026

(54) PRINTED STRUCTURE WHICH PROVIDES DAMPING AND SEALING IN AN ELECTRICAL CONNECTOR

(71) Applicant: TE Connectivity Solutions GmbH, Schaffhausen (CH)

(72) Inventors: Jessica H.B. Hemond, Mifflintown, PA (US); Ranjan Deepak Deshmukh, Mechanicsburg, PA (US); David Bruce Sarraf, Elizabethtown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 291 days.

(21) Appl. No.: 18/482,040

(22) Filed: Oct. 6, 2023

(65) Prior Publication Data

US 2025/0118926 A1 Apr. 10, 2025

(51) Int. Cl.
*H01R 13/52* (2006.01)

(52) U.S. Cl.
CPC ....... *H01R 13/521* (2013.01); *H01R 13/5216* (2013.01)

(58) Field of Classification Search
CPC .............. H01R 13/521; H01R 13/5216; H01R 13/5219; H01R 13/533
See application file for complete search history.

(56) References Cited

U.S. PATENT DOCUMENTS

| | | | | |
|---|---|---|---|---|
| 5,562,477 | A | 10/1996 | Moore et al. | |
| 9,397,438 | B2 * | 7/2016 | Chen | H01R 13/5219 |
| 10,808,794 | B1 | 10/2020 | Boyce et al. | |
| 2017/0093081 | A1 * | 3/2017 | Yang | H01R 13/5202 |
| 2019/0157797 | A1 * | 5/2019 | McDowell | H01R 13/506 |
| 2020/0303871 | A1 * | 9/2020 | Maeda | H01R 13/5216 |
| 2020/0335895 | A1 * | 10/2020 | Liu | H01R 13/04 |
| 2025/0118926 | A1 * | 4/2025 | Hemond | H01R 13/5216 |

FOREIGN PATENT DOCUMENTS

| | | | | |
|---|---|---|---|---|
| CN | 105458262 | A | 4/2016 | |
| CN | 112758519 | A | 5/2021 | |
| DE | 2020150013317 | U1 | 5/2015 | |
| EP | 3174166 | B1 | 5/2017 | |
| KR | 20140125122 | A * | 10/2014 | H01R 13/5202 |

OTHER PUBLICATIONS

Wang et al., "Vibration and damping characteristics of 3D printed Kagome lattice with viscoelastic material filling", Scientific Reports, pp. 1-13 (2018).

* cited by examiner

*Primary Examiner* — Abdullah A Riyami
*Assistant Examiner* — Nader J Alhawamdeh

(57) ABSTRACT

A seal/damping component for use in an electrical connector, the seal/damping component providing sealing and vibration damping when the seal/damping component is positioned in the electrical connector. The seal/damping component may be made from one material or two or more materials.

21 Claims, 5 Drawing Sheets

PRINTED STRUCTURE WHICH PROVIDES DAMPING AND SEALING IN AN ELECTRICAL CONNECTOR

FIELD OF THE INVENTION

The invention relates to structures which provide damping and sealing to an electrical connector. In particular, the invention relates to structures formed from additive printing processes which provide selective damping while maintaining the ability to seal.

BACKGROUND OF THE INVENTION

In many environments, such as, but not limited to, internal combustion engines and other high vibration environments, electrical components are used to perform control functions and other tasks. Those electrical components must be interconnected with electrical conductors or wires. To facilitate easy installation and removal, electrical components are generally connected to the wiring by an electrical connector. The electrical connector is connected to the wiring which in turn is connected to the other various electrical components. For ease of repair and installation, a separable interface is often preferred. The electrical connector generally includes a plug and a receptacle which permits the electrical connection to be formed. Depending on the environment, the connectors can be exposed to wide ranges of temperature, moisture, oil, vibrations and other conditions that might cause damage.

In such environments, the connector may be exposed to significant vibrations. Vibrations can cause small movements between the connecting terminals of an electrical connector and/or contribute to larger motions which can damage or break components such as housings. Over time, those movements can result in localized mechanical wear of the pin, socket and or the plating on the contact, among other things. The vibrations may degrade the electrical connection and in some cases could break the connection altogether. Smaller vibrations may also cause micromotion which would induce a fretting wear failure. Vibration damage is even more likely when the vibrations occur at approximately the same frequency as the natural frequency of the electrical connector. Vibration can be controlled via isolation or damping. Isolation will typically involve mechanical locks and/or increased bulk to prevent the vibration from propagating the sensitive electrical connections. Alternately a damping component could be utilized to absorb the vibration thus protecting the sensitive connections.

In addition, the connector may be exposed to moisture and other contaminants. Over time, the contaminants can cause the electrical connection between the terminals in the electrical connectors to fail.

While known connectors may have a seal component and a damping component, the seal component is a separate and distinct component from the damping component. This is necessitated by the fact that the material and structure of known seal components is not conducive to providing damping, and the material and structure of known damping components is not conductive to providing sealing.

It would, therefore, be beneficial to provide one component which provides both sealing and damping to an electrical connector. It would be beneficial to provide the component with an engineered internal structure formed from additive printing processes which provide selective damping while maintaining the ability to seal.

SUMMARY OF THE INVENTION

An object of the invention is to provide a component which provides both sealing and damping.

An embodiment is directed to a seal/damping component for use in an electrical connector, the seal/damping component providing sealing and vibration damping when the seal/damping component is positioned in the electrical connector. The seal/damping component may be made from one material or two or more materials.

The seal/damping component may have geometry based damping allowing for selective damping regions while maintaining sealing capability. In illustrative embodiments the geometry based damping are pillars which have a higher Shore hardness than a base material of the seal/damping component creating an isolation effect on the overall system Alternately, the pillars may be comprised of a softer material which can act as a damping element.

The seal/damping component may have a frame with a first surface and an oppositely facing second surface. Internal features extend from the first surface to the second surface. The internal features increase the stiffness of the seal/damping component. In illustrative embodiments, the internal features are helical springs. Material is backfilled in the frame to provide additional damping without compromising the ability of the frame to resist taking a set when the seal/damping member is compressed during sealing. Terminal receiving openings may be provided in the seal/damping member.

The seal/damping component may have a frame with a first surface and an oppositely facing second surface. Geometry based damping members are provided in the frame to provide selective damping regions. In illustrative embodiments, the geometry based damping member is a lattice structure which extends from the first surface to the second surface. An inner opening is provided in the frame and is filled with a second material. The geometry based damping members are made from a material which may be stiffer than the second material or in cases where the overall sealing member is stiffer, softer to enable damping.

The seal/damping member is made from dielectrically insulative material which maintains insulative properties and is chemically resistant to industrial fluids or which is coated with a coating which is chemically resistant to industrial fluids. The material will also be selected to be thermally stable at the end use temperature of the connector.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
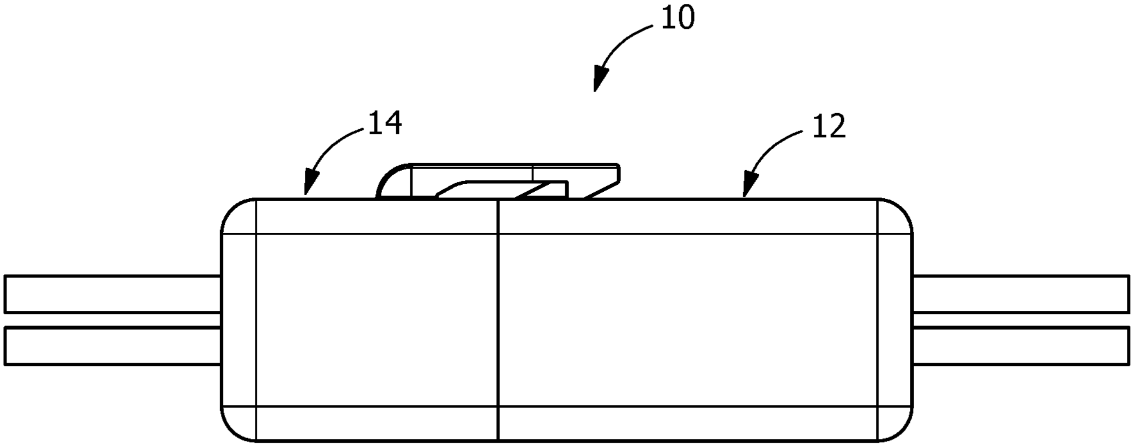
FIG. 1 is a perspective view of an illustrative first connector mated to an illustrative second connector, the first connector having a seal/damping member provided thereon.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top” and “bottom” as well as derivative thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation unless explicitly indicated as such. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
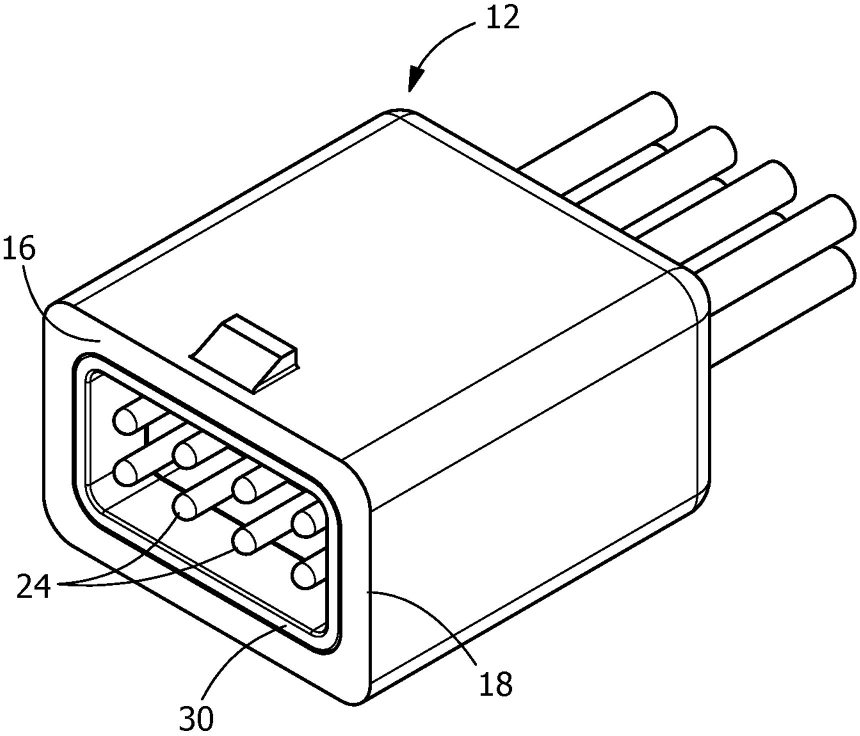
FIG. 2 is a perspective view of the first connector of FIG. 1.
Figure 3:
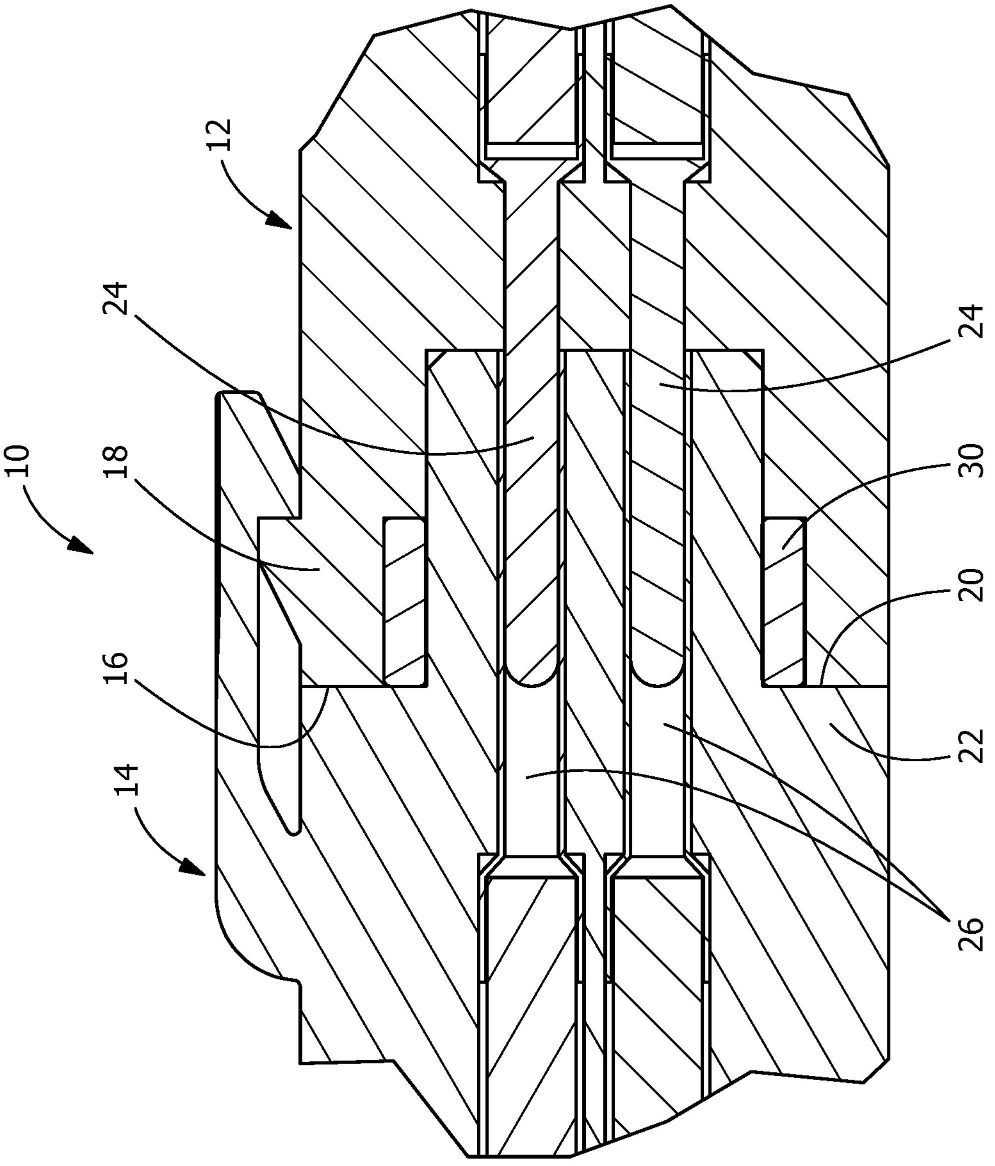
FIG. 3 is a cross-sectional view taken along line 3-3 of FIG. 1.

As shown in FIGS. 1 through 3, an illustrative electrical connector assembly 10 includes a first electrical connector 12 and a mating second electrical connector 14. The connector assembly 10, the first electrical connector 12 and the second electrical connector 14 are meant to be illustrative and not limiting. The connector assembly 10, the first electrical connector 12 and the second electrical connector 14 may have different configurations and different functions without departing from the scope of the invention.

As shown in FIG. 3, a first mating face 16 of a first mating portion 18 of the first connector 12 is positioned in alignment with a second mating face 20 of a second mating portion 22 of the second connector 14. An illustrative of a unitary seal/damping component or member 30 is provided in the first mating portion 18. In the illustrative embodiment shown, the seal/damping member 30 extends about the circumference of the first mating portion 18, as shown in FIG. 2. However, in other embodiments, the seal/damping member 30 may be provided in other locations.

When the connector assembly 10 is fully assembled, as shown in FIG. 3, the seal/damping member 30 engages one or more surfaces of the first mating portion 18 and one or more surface of the second mating portion 22 to block the ingress of contaminants to terminals 24 of the first connector 12 and terminals 26 of the second connector 14, as will be more fully described. The seal/damping member 30 also absorbs energy and reduces motion between the first connector 12 and the second connector 14, as will be more fully described. In the illustrative embodiment shown, member 20 is a separate component from other members. However, it is possible to leverage manufacturing methods to overprint or similarly direct attach member 20 onto members such as member 12, 22 or 24. The structural concepts of member 20 would remain unchanged.

Figure 4:
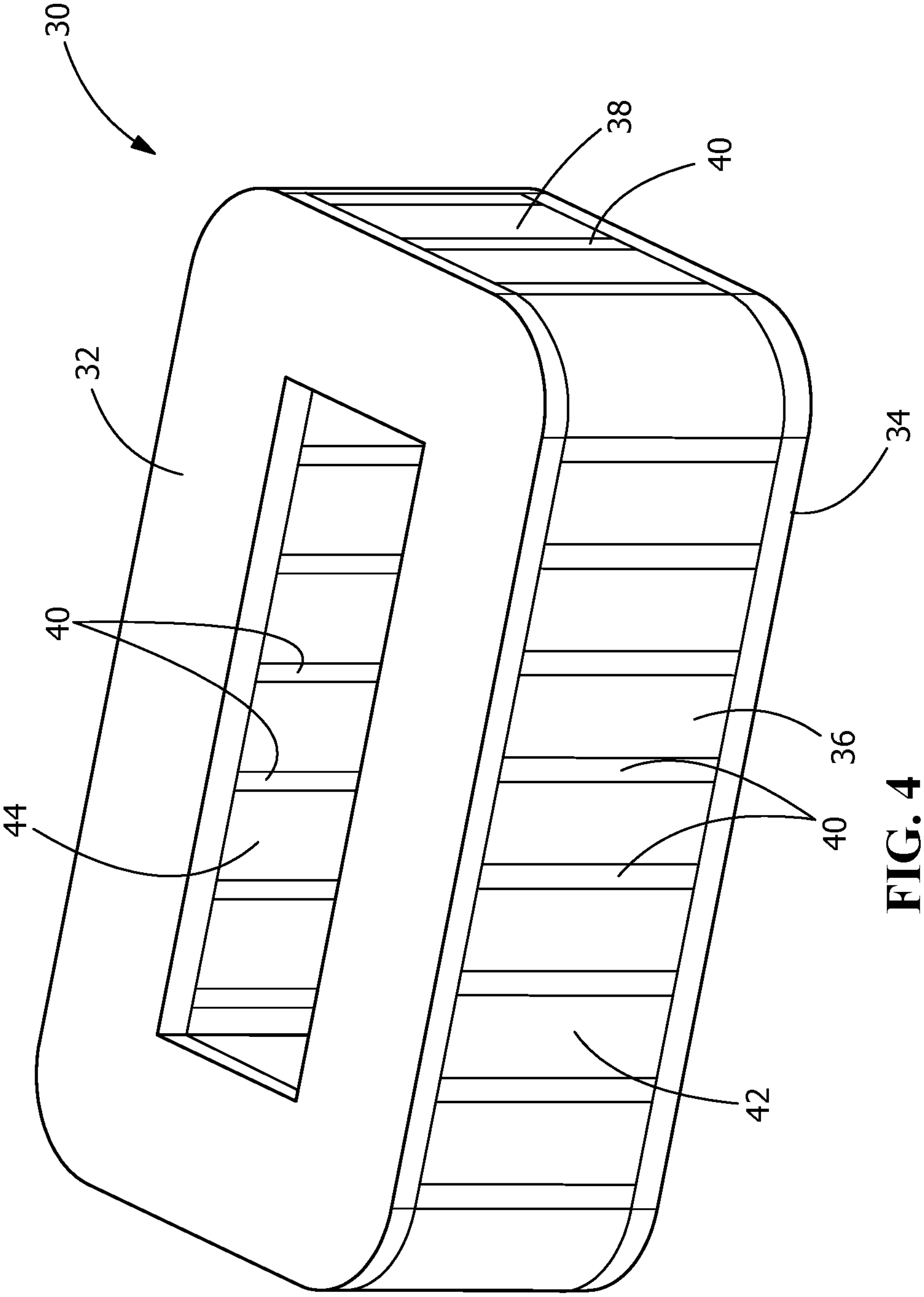
FIG. 4 is a perspective view of a first illustrative embodiment of a seal/damping member.

An illustrative embodiment of a seal/damping member 30 is shown in FIG. 4. In this embodiment, the seal/damping member 30 has a first surface 32 and an oppositely facing second surface 34. Side walls 36 and end walls 38 extend between the first surface 32 and the second surface 34.

The seal/damping member 30 is made from an additive manufacturing process, such as but not limited to, 3D printing. The seal/damping member 30 includes geometry based damping allowing for selective damping regions while maintaining sealing capability through selection of materials. In the embodiment shown in FIG. 4, the geometry based damping is provided by pillars 40 which extend from the first surface 32 to the second surface 34. The pillars may be made from the same material as the base material 42 or from a different material. If the pillars 40 are made from the same material, the structure of the pillars 40 is configured to provide increased stiffness.

In the embodiment shown, the pillars 40 are made from a material which has a higher Shore hardness or is stiffer than the base material 42 of the seal/damping member 30. For example, the pillars 40 may be made of, but are not limited to, acrylate based rubber, silicone rubber, ethylene propylene diene monomer rubber or fluoropolymer. Other materials may include, but are not limited to, fine pitch open cell or closed cell foam from acrylate, urethane, silicone or other material with desirable chemical resistance and Shore hardness. Although the illustrative embodiment illustrates the seal/damping member 30 is made using an additive manufacturing process, the seal/damping member 30 could be made by overmolding or backfilling the base material 42 over an insert which includes the pillars 40. Alternately the foamed structure may be formed by using a dissolvable or removable substrate which can be overprinted, overmoled, backfilled or similar processing.

In the illustrative embodiment shown, the seal/damping member 30 has an inner opening or cavity 44. The seal/damping member 30 is configured to engage one or more surfaces of the first mating portion 18 and one or more surface of the second mating portion 22, as previously described. However, the seal/damping member may have other configurations, such as, but not limited to a solid block to be positioned in other locations of an electrical connector. In other words, the seal/damping member 30 may deployed locally instead of globally around the edge of the connector. Regardless of the configuration and location, the seal/damping member 30 is configured to block the ingress of contaminants to terminals of the connector and to absorb energy and reduce motion between the mated connectors.

The use of an additive manufacturing process allows the inherent material performance of a material to be enhanced by providing different structures and different locations to create a complex seal/damping member 30 having an advanced structure composite. This allows for a sealing material that does not dampen to be modified by use of structures to develop an end component that can dampen while maintaining the sealing capability. For example, first structures, such as the base material 42 can have a structure which provides the characteristics, such as compressibility, needed to provide proper sealing, and second structures, such as the pillars 40, can have a structure which provide the characteristics, such as stiffness, needed to provide proper isolation or softer materials to allow for damping.

Alternatively, the use of an additive manufacturing process allows the seal/damping member 30 to have component made from two different materials. This allows a first material, such as the base material 42 to have the characteristics, such as compressibility, needed to provide proper sealing, and a second material, to have the characteristics, such as stiffness, needed to provide proper damping.

Figure 5:
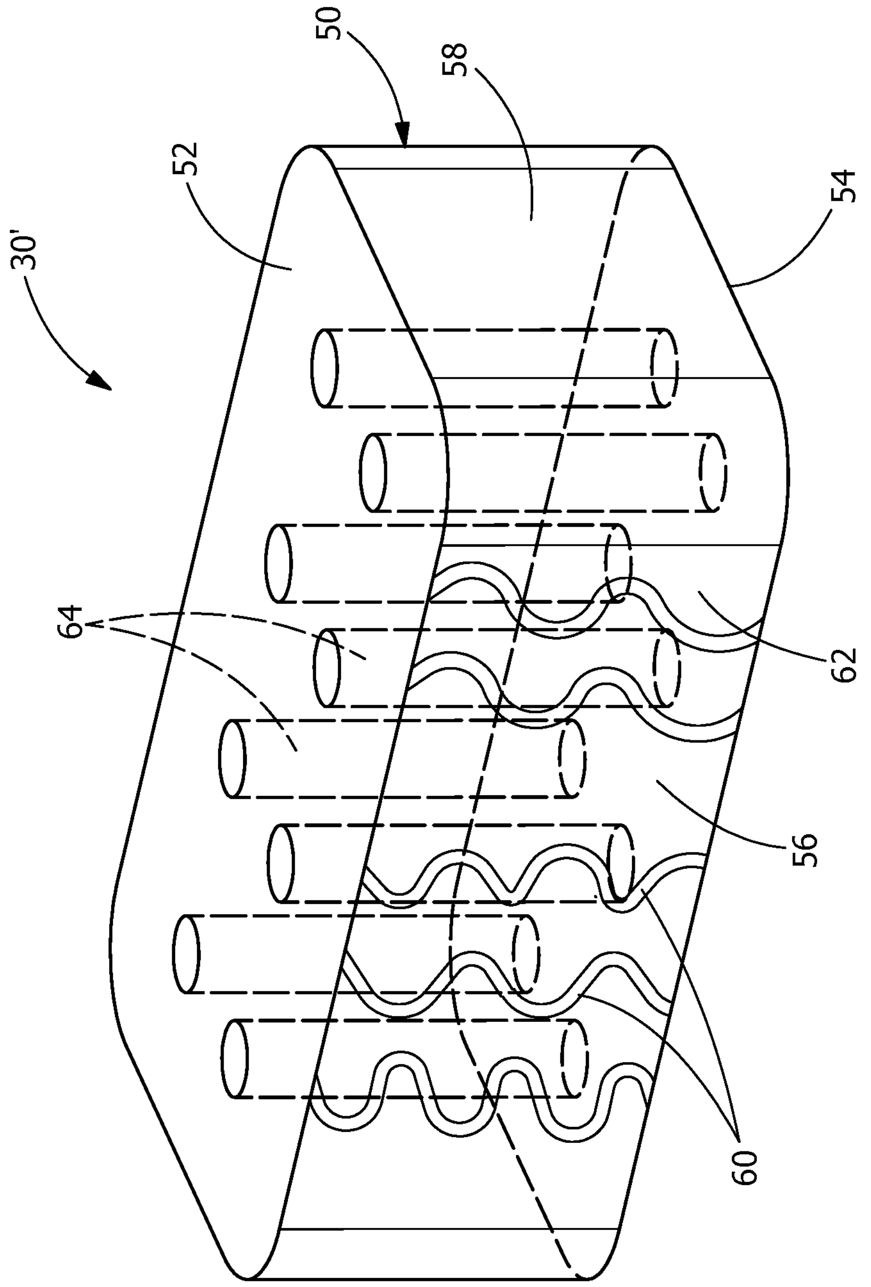
FIG. 5 is a perspective view of a second illustrative embodiment of a seal/damping member.

A second illustrative embodiment of a seal/damping member 30' is shown in FIG. 5. In this embodiment, the seal/damping member 30' has a frame 50 with a first surface 52 and an oppositely facing second surface 54. Side walls 56 and end walls 58 extend between the first surface 52 and the second surface 54.

The seal/damping member 30' is made from a molding process or an additive manufacturing process, such as but not limited to, 3D printing. The frame 50 is made from a material capable of providing damping. Internal features 60, which extend from the first surface 52 to the second surface 54 increase the stiffness of the frame 50 to improve part stiffness. In the illustrative embodiment shown, the internal features 60 are helical springs, but other structures may be used.

Material 62 is backfilled in the frame 50 to provide additional damping without compromising the ability of the frame 50 to resist taking a set when the seal/damping member 30 is compressed during sealing. The material 61 can be a gel, liquid or other material having the desired characteristics.

Terminal receiving openings 64 may be provided in the seal/damping member 30' in application in which the seal/damping member 30' is used to seal around individual terminals (not shown) in a mating face of a connector (not shown).

Figure 6:
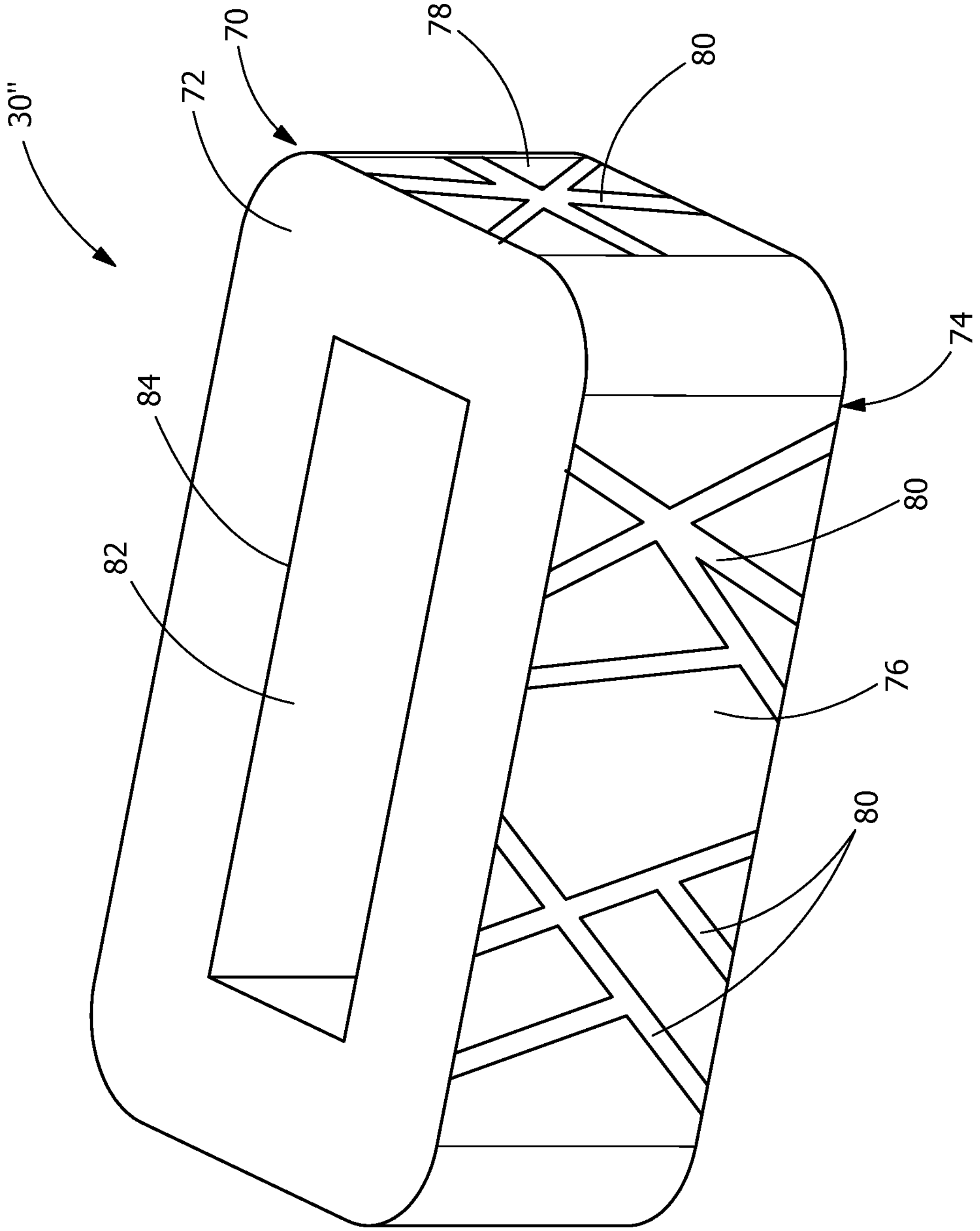
FIG. 6 is a perspective view of a third illustrative embodiment of a seal/damping member.

A third illustrative embodiment of a seal/damping member 30" is shown in FIG. 6. In this embodiment, the seal/damping member 30" has a frame 70 with a first surface 72 and an oppositely facing second surface 74. Side walls 76 and end walls 78 extend between the first surface 72 and the second surface 74.

The seal/damping member 30 is made from an additive manufacturing process, such as but not limited to, 3D printing. The frame 70 of the seal/damping member 30 includes geometry based damping allowing for selective damping regions. In the embodiment shown in FIG. 5, the geometry based damping is provided by the geometry based damping member or a lattice structure 80 which extend from the first surface 72 to the second surface 74. An inner opening or cavity 84 is provided in the frame 70. The inner opening or cavity 84 may be filled with material 82.

In the embodiment shown, the lattice structure 80 is made from a material which is has a higher Shore hardness or is stiffer than the material 82 of the seal/damping member 30". For example, the lattice structure 80 may be made of a stiff acrylate based rubber. The material 82 has characteristics, such as compressibility, needed to provide proper sealing. For example, the material 82 may be a soft rubber of silicone, urethane, acrylate or similar soft materials. The seal/damping member 30" may deployed locally instead of globally around the edge of the connector, as previously described. In specific cases, the damping or softer component 80 will be structured and the inner material 82 will provide the sealing capability. The stiffness of the part will be variable to allow for customized structure to suit end product needs and to accommodate the vibration frequency the part is exposed to.

The seal/damping members 30, 30', 30" are made from dielectrically insulative material which has a compression set which is based on the application. The material is wear and tear resistance and may be chemically resistant to industrial fluids, such as, but not limited to gasoline, transmission fluid, oil, cleaning chemicals. Alternatively, the material may be coated with a coating that has the chemically resistant properties desired.

The seal/damping members 30, 30', 30" may be used in various conditions, including, but not limited to temperatures ranges between −40 degrees Celsius to 200 degrees Celsius. The temperature range of particular materials used for the seal/damping members 30, 30', 30" are influenced by the compression set needed.

The sealing portion of the seal/damping members 30, 30', 30" have a Shore hardness in the range of about 10 to about 70, preferably in the range of about 20 to about 60. The measure needed for damping will be driven by the end frequency needed to dampen coefficient coupled with the modulus of the material used for damping.

The seal/damping members 30, 30', 30" as described herein used mechanical features and/or the combination of two separate materials in a composite structure to create an overall part that can perform in multiple areas outside of its individual materials. This allows the seal/damping members 30, 30', 30" to provide sealing and damping with the need of additional additives or modifiers.

While the invention has been described with reference to a preferred embodiment, it will be understood by those skilled in the art that various changes may be made and equivalents may be substituted for elements thereof without departing from the spirit and scope of the invention as defined in the accompanying claims. For example, the invention can be used with different types and shapes of peripheral seals, wire seals and gang seals. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A seal/damping component for use in an electrical connector, the seal/damping component comprising:

a first surface;

an oppositely facing second surface;

stiffening structural members extending from the first surface to the second surface;

wherein the seal/damping component being a unitary component providing sealing and vibration damping when the seal/damping component is positioned in the electrical connector.

2. The seal/damping component as recited in claim 1, wherein the seal/damping component is made from one material.

3. The seal/damping component as recited in claim 1, wherein the seal/damping component is made from two materials.

4. The seal/damping component as recited in claim 1, wherein the seal/damping component is coated.

5. The seal/damping component as recited in claim 1, wherein the seal/damping component has geometry based damping allowing for selective damping regions while maintaining sealing capability.

6. The seal/damping component as recited in claim 5, wherein the the stiffening structural members are pillars.

7. The seal/damping component as recited in claim 6, wherein a base material extends from the first surface to the second surface.

8. The seal/damping component as recited in claim 7, wherein the pillars have a higher or lower Shore hardness than the base material.

9. The seal/damping component as recited in claim 8, wherein the pillars are made from the same material as the base material.

10. The seal/damping component as recited in claim 8, wherein the pillars are made from the a different material with the same, higher or lower Shore hardness than the base material.

11. The seal/damping component as recited in claim 1, wherein the seal/damping component has a frame with the stiffening structural members extending internal to side walls of the frame.

12. The seal/damping component as recited in claim 11, wherein the internal stiffening structural members increase the stiffness of the seal/damping component.

13. The seal/damping component as recited in claim 12, wherein the internal stiffening structural members are helical springs.

14. The seal/damping component as recited in claim 12, wherein material is backfilled in the frame to provide additional damping without compromising the ability of the frame to resist taking a set when the seal/damping member is compressed during sealing.

15. The seal/damping component as recited in claim 12, wherein terminal receiving openings are provided in the seal/damping member.

16. The seal/damping component as recited in claim 1, wherein the seal/damping member has a frame with a first surface and an oppositely facing second surface, geometry based damping members are provided in the frame to provide selective damping regions.

17. The seal/damping component as recited in claim 1, wherein the stiffening structural members is a lattice structure.

18. The seal/damping component as recited in claim 16, wherein an inner opening is provided in the frame and is filled with a second material.

19. The seal/damping component as recited in claim 16, wherein the stiffening structural members are made from a material which is stiffer or softer than the second material.

20. The seal/damping component as recited in claim 1, wherein the seal/damping member is made from dielectrically insulative material which is chemically resistant to industrial fluids.

21. The seal/damping component as recited in claim 1, wherein a sealing portion of the seal/damping member has a Shore hardness of between about 10 to about 70.

* * * * *